Sept. 20, 1971        S. S. LAZARUS        3,605,321
INSECTICIDE VAPOR GENERATING ASSEMBLY
Filed Aug. 19, 1969
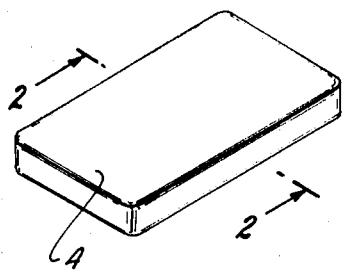
FIG. 1
FIG. 2
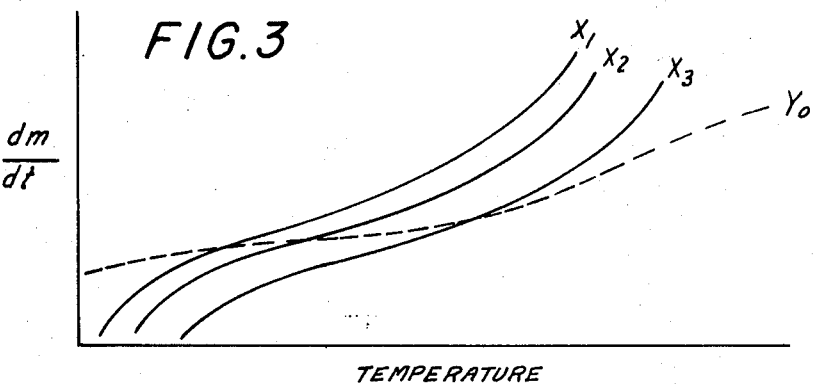
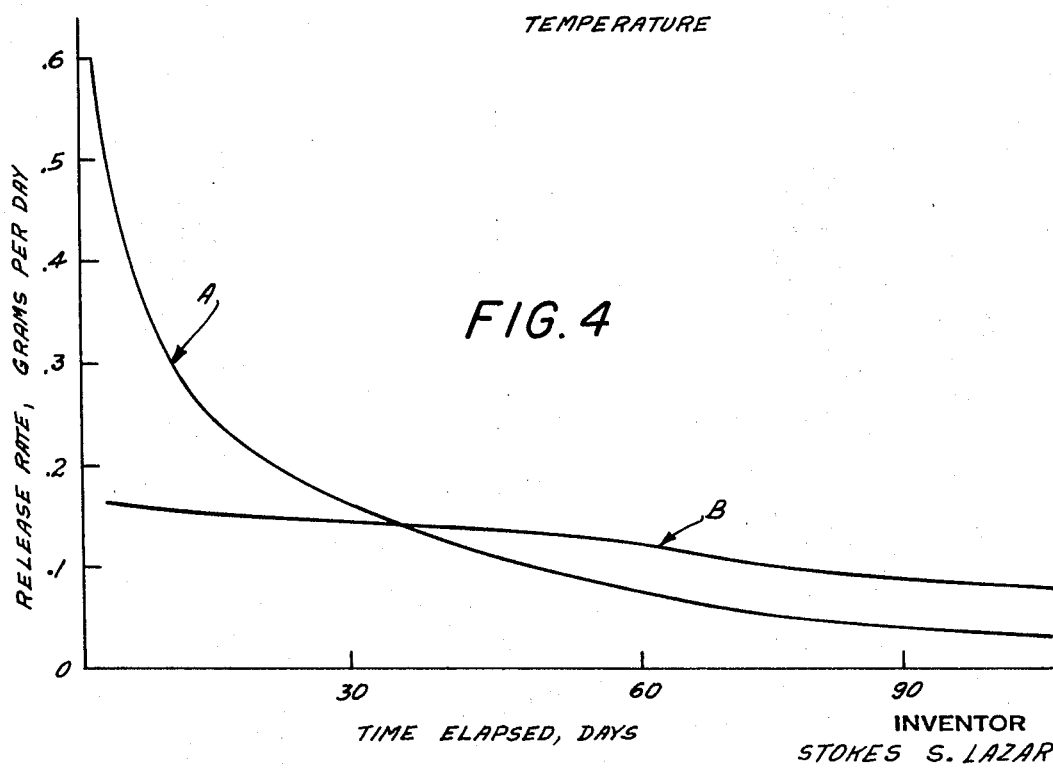
INVENTOR
STOKES S. LAZARUS
BY
ATTORNEY

United States Patent Office 3,605,321
Patented Sept. 20, 1971

3,605,321
INSECTICIDE VAPOR GENERATING ASSEMBLY
Stokes S. Lazarus, 4340 Crestview Road,
Harrisburg, Pa. 17112
Filed Aug. 19, 1969, Ser. No. 851,501
Int. Cl. A01m 1/20
U.S. Cl. 43—131                                       9 Claims

ABSTRACT OF THE DISCLOSURE

In order to control the uniformity of vapor emission and to maximize the time during which an effective amount of vapor emission occurs, an absorbent body is impregnated with vaporizable material and is completely surrounded by a vapor-permeable plastic sheath which does not enter into a solubility relationship with the vaporized material and therefore controls the rate of vapor emission.

---

The present invention relates to an insecticide vapor generating assembly designed to function effectively for longer periods of time, and to have a more uniform insecticide effect, than has previously been attained.

The problem of providing long term insecticide action is a difficult one, particularly where the insecticide itself, in its relatively pure form, may have harmful or undesirable effects. The problem is greatly aggravated when the space to be protected is not enclosed, or when an excessive concentration of insecticide vapor could be harmful or dangerous. Merely providing a supply of volatilizable insecticide is not the answer. Unless some means are provided to control the vaporization of the insecticide material it will either evaporate rapidly or else produce in a confined space an excessively high concentration of insecticide vapor, or both. This is true whether the insecticide is provided in bulk or is deposited, as by being sprayed, on available surfaces.

The achievement of uniformity of insecticide action is particularly elusive. Whatever the amount of insecticide material initially provided, the rate of vaporization will tend to be dependent upon the amount of insecticide material remaining, and particularly its concentration at the surface where vaporization takes place, and as that material vaporizes, thereby reducing the amount or concentration of material remaining, the rate of subsequent vaporization decreases. Hence the user of the material is presented with a dilemma—he must either accept an excessively high vaporization rate at the beginning of use, which may be annoying and even physically dangerous, or he must accept an excessively low vaporization rate toward the end of the designed period of use.

The result has been that replenishment or replacement of the vaporizable insecticide is required at frequent intervals if effective insecticide action is desired over a period of time.

Moreover, many insecticides are dangerous to human beings or other animals if touched or tasted. The wholesale application of such insecticides in bulk is therefore inadmissible.

It has been proposed in the past to impregnate or saturate absorbent bodies with vaporizable insecticide, particularly when that insecticide is in liquid form, thereby to facilitate the handling of the insecticide and, by providing only a limited surface area at which vaporization can take place, hopefully to limit the rate of vaporization and thereby prolong the effective life of the impregnated body. This approach has been satisfactory in ameliorating the handling problem, but it has been relatively ineffective in achieving substantial uniformity of insecticide emission over an extended period of time, such as weeks. An analogous approach, used particularly in connection with dimethyl dichlorovinyl phosphate (DDVP), has been to form a solid solution between the insecticide and an inert carrier, the insecticide volatilizing from the carrier in a fashion analogous to its volatilization from an absorbent body but the amount of material available for volatilization being controlled to some degree by its solubility in the carrier. However, this solid solution approach to the problem in fact has not resulted in a uniform rate of emission of the insecticide vapors, so that the insecticide effect at the beginning of use is many times as great as the insecticide effect after a period of time has elapsed. For example, the rate of insecticide emission at the beginning of use is often more than three times as great as the emission rate after thirty days, and more than six times as great as the emission rate after sixty days.

It is the prime object of the present invention to devise an insecticide vapor generating assembly which avoids the above disadvantages, and which in particular will provide for substantially uniform insecticide effect over an extended period of time.

It is another object of the present invention to devise such an assembly which is convenient and safe to use.

It is an additional object of the present invention to devise an assembly which is capable of utilizing large amounts of insecticide material and therefore to provide effective insecticide action over exceptionally long periods of time.

It is also an object of the present invention to provide such an assembly the vapor generation rate of which is relatively insensitive to ambient conditions such as temperature.

It is a further object of the present invention to provide such an assembly in which the maximum rate of vapor release is relatively low, thereby producing an assembly which is exceedingly safe to use even in confined spaces.

It is yet another object of the present invention to devise such an assembly which may be manufactured inexpensively.

In accordance with the present invention a supply of vaporizable insecticide, such as liquid DDVP, is caused to impregnate or saturate a porous body of inert material. That body is then completely enclosed and "sealed" inside a sheath of sheet material formed of appropriate plastic material, that sheet material preferably being heat-shrunk upon the absorbent body in order to produce a neat and easily handleable assembly. The plastic material used for the sheath should be liquid impermeable, so that the vaporizable material itself cannot escape from the absorbent body. The sheet material should be somewhat vapor-permeable, so that a limited degree of vaporization of the insecticide can take place from the absorbent body and escape into the surrounding atmosphere. The material should further be substantially incapable of entering into a solubility relationship with the insecticide, so that the vapor-permeability of the plastic sheet provides the main, if not the only, control on the rate of volatilization of the insecticide. By selecting a plastic sheet material with the desired degree of vapor-permeability and by providing that material in a sheet of appropriate thickness, the actual rate of vapor emission of the assembly can be tailored, within limits, to whatever value is desired in a given application, and the rate of vapor emission will remain substantially constant over an extended period of time even as long as two months or more.

To the accomplishment of the above, and to such other objects as may hereinafter appear, the present invention relates to the construction of an insecticide vapor generating assembly as defined in the appended claims and as described in this specification, taken together with the accompanying drawings, in which:

FIG. 1 is a three-quarter perspective view of a typical embodiment of the present invention;

FIG. 2 is a cross sectional view thereof taken along the line 2—2 of FIG. 1;

FIG. 3 is a graphical representation of vapor-release rate as against variations in temperature, typical characteristic curves of prior art devices and the device of the present invention being compared; and FIG. 4 is a graphical representation of vapor release rate as against time, with prior art devices and the device of the present invention being compared.

The device of the present invention is here specifically disclosed in conjunction with the use of a particular insecticide, to wit, dimethyl dichlorovinyl phosphate (DDVP), which is normally present in liquid form. This material, while highly effective as an insecticide, is harmful to mammals when present in excessive concentration. This particular insecticide is, therefore, typical of those which present the problems to which the present invention is directed—minimizing the maximum vaporization rate, keeping the vaporization rate within tolerable levels at all times, and maintaining the vaporization rate at a substantially constant effective level over an extended period of time.

The vapor generating assembly of the present invention comprises an absorbent body 2 of appropriate size and shape. Typically such a body may be in the form of a strip of perahps 1¾ inches wide, 9¾ inches long, and ⅜ inch thick. The nature of the material of which the absorbent body 2 is formed is not critical, so long as the body 2 will absorb the liquid insecticide and will not adversely react with it. For use with DDVP paper has been found to be a satisfactory material. It has adequate absorbent power, it does not react with DDVP, and it is inexpensive and light in weight. Other suitable materials for the body 2 are sponge, cotton, or hair, for example. Individual bodies 2 made with such materials may be formed inexpensively, and without having to use special or complicated equipment. This contrasts markedly, for example, with the "solid solution" approach to the problem referred to above; there the material with which DDVP enters into solid solution is polyvinyl chloride, and the bodies of that plastic material into which the DDVP is dissolved are formed by plastic extrusion.

The body 2 is impregnated with an appropriate amount of insecticide such as DDVP. The maximum amount of insecticide which can be carried by the body 2 will be determined by the size of the body and by its absorbency. In a typical application a paper body 2 having a weight of approximately 100 grams can carry 20 grams or more of active DDVP.

If one were to use the insecticide-impregnated body 2 by itself the vaporization of the DDVP would proceed at a very high rate, and hence the effective life of the impregnated body would be quite limited. Moreover, uncontrolled vaporization of DDVP produces an emission rate which, while very lethal to insects, is also dangerous to mammals.

To solve this problem the insecticide-impregnated body 2 is surrounded by a plastic sheath 4 of material which is liquid impermeable, which is slightly vapor-permeable, and which is substantially incapable of entering into a solubility relationship with the insecticide being used. When DDVP is the insecticide, excellent results are obtained when the sheath 4 is formed of non-halogenated olefins or fluoroplastics polymerized with themselves or copolymerized with other substances. Polyethylene is a typical non-halogenated olefin and polytetrafluoroethylene is a typical fluoroplastic which may be used in this connection. These materials, when provided in sheet or film form, provide the desired characteristics, and in particular have a micro-porosity characteristic which serves effectively to control the rate of vaporization of the DDVP with which the absorbent body 2 is impregnated. A typical vapor permeability is that which gives rise, for a DDVP-impregnated body of the size set forth above, to emission at the rate of 16 grams of DDVP/day at 78° F. into an atmosphere at 50% relative humidity. This rate will vary for different applications, often by as much as ±30%. The thickness of the sheath 4 may be selected within limits to provide the desired rate of release of insecticide—the thicker the material the lower will be the rate of insecticide release. In a typical application a polyethylene sheet having a thickness of .00125″ can be used to surround a 100-gram absorbent body 2 containing 20 grams of DDVP insecticide to provide for an appropriate rate of release of insecticide vapor.

Preferably the material of which the sheath is formed is heat-shrinkable, the sheath being applied to the absorbent body 2 after the latter has been impregnated and then heat-shrunk around the latter so as to snugly enclose it, thereby to a produce a neat and easily-handleable unit.

FIG. 3 is a graphical representation of rate of vapor release measured in terms of rate change of insecticide mass in the assembly (shown on the ordinate) as against temperature (shown on the abscissa). The curves labelled $x_1$, $x_2$ and $x_3$ are typical of vapor generating assemblies of the prior art embodying the "solid solution" approach mentioned above. It will be seen that with such units the rate of vapor release varies considerably with temperature, a phenomenon which is to be expected since there is nothing to control the normal tendency of the material to come out of solid solution and volatilize more rapidly as the temperature rises. The broken line curve $y_0$ represents the characteristic of a DDVP-releasing device of the present invention, utilizing a polyethylene sheath 4. It will be seen that while the rate of vapor generation is somewhat greater at higher temperatures than the lower temperatures, the different between the maximum and minimum values of vapor generation rate is much less than is the case when DDVP is employed in solid solution with polyvinyl chloride. Not only is this relative insensitivity to temperature a desirable characteristic in and of itself, but its existence demonstrates the different mechanism involved in the device of the present invention as compared to that of the prior art.

FIG. 4 is another graphical representation showing, on the ordinate, vapor release rate in terms of grams per day, and on the abscissa number of days. The curve designated A represents the characteristic of an existing DDVP-solid solution unit, while the curve designated B represents the characteristic of a device made in accordance with the present invention and using a polyethylene for the sheath 4. It will be seen from FIG. 4 that (a) the device of the present invention has a release rate considerably more uniform with time than the "solid solution" strip, (b) at no time does the release rate of the strip of the present invention even approach possibly dangerous levels, and (c) after thirty days the strip of the present invention has a higher insecticide vapor generation rate than the other unit. The curves shown in FIG. 4 represents tests with units of the same weight. Other tests at different temperatures give comparable results.

Thus the assemblies of the present invention are seen to be composed of inexpensive and readily available materials which may be fabricated and assembled simply and without having to use expensive equipment. The resulting unit is convenient and safe to handle, and its long term insecticidal effect is markedly superior to that produced by the prior art, not only as to uniformity of rate of vapor generation and longevity of effective action, but also as to minimization of maximum vapor generation rate. The device of the present invention is therefore more effective as an insecticide device than the prior art and also safer to use.

While but a limited number of embodiments of the present invention have been here specifically disclosed, it will be apparent that many modifications and variations

I claim:

1. An insecticide vapor generating assembly comprising an absorbent body impregnated with a non-residual volatilizable insecticide, and a sheath completely encompassing said body, said sheath being formed of imperforate plastic self-sustaining sheet material having a heat shrinkage characteristic which is liquid impermeable, vapor permeable, and substantially incapable of entering into a solubility relationship with said insecticide.

2. The assembly of claim 1, in which said sheet material is shrunk around said body so as to snugly engage the latter.

3. The assembly of claim 1, in which said insecticide is DDVP.

4. The assembly of claim 3, in which said sheet material comprises a polymer or copolymer from the group consisting of fluoroplastics and non-halogenated olefins.

5. The assembly of claim 4, in which said sheet material comprises polyethylene.

6. The assembly of claim 4, in which said sheet material comprises polytetrafluoroethylene.

7. The assembly of claim 3, in which said sheet material is shrunk around said body so as to snugly engage the latter.

8. The assembly of claim 7, in which said sheet material comprises polyethylene.

9. The assembly of claim 7, in which said sheet material comprises polytetrafluoroethylene.

References Cited

UNITED STATES PATENTS

| | | | |
|---|---|---|---|
| 2,956,366 | 10/1960 | Wiesmann | 43—131 |
| 3,032,915 | 5/1962 | Abel | 43—131 |
| 3,295,246 | 1/1967 | Landsman et al. | 43—131 |

WARNER H. CAMP, Primary Examiner